June 4, 1935.  E. COENNING  2,004,036
ANTISKIDDING TIRE
Filed June 8, 1933

Inventor:
E. Coenning
By: Marks & Clerk
Attys.

Patented June 4, 1935

2,004,036

UNITED STATES PATENT OFFICE 2,004,036

ANTISKIDDING TIRE

Ernst Coenning, Halensee, near Berlin, Germany

Application June 8, 1933, Serial No. 674,951
In Germany June 10, 1932

6 Claims. (Cl. 152—14)

This invention refers broadly to covers for pneumatic tires and the like, and it is one of the important objects of the invention to improve the anti-skidding properties of such covers, so as to produce a better protection against skidding than it has been possible to obtain by the covers of the kind heretofore employed. In accordance with the invention the projecting suction cups ordinarily employed for increasing the safety against skidding are disposed upon circumferential ribs of the pneumatic cover in such a manner that the cavity of the cups extends into the body of the ribs. By this means the life of the tire is considerably increased, even in the case of excessive wearing of the tire which is particularly noticeable when driving over rough roads whereby the tread of the tire is heavily strained and the suction cups are more rapidly worn off than the usual tread sections. However, if, after having been used on about five thousand miles (about 8 thousand kilometers) of driving, the suction cups have been worn down to the surface of the ribs, the cavities which extend into the ribs continue to produce a sucking action, thereby improving the adhering qualities of the tire, so that even after this amount of usage and after very considerable wearing off of the tire even on slippery roads the tire may be relied upon to still possess very good adhering qualities. This adhesion is particularly perfect in case the circumferential ribs are connected by transverse ribs in such a manner that the depressions existing between the circumferential ribs and the transverse ribs present such a small area that in the case of tires submitted to the normal load the depressions in the tread resting against the ground will be closed by the contact therewith. The depressions will then likewise constitute sucking cups adapted to counteract the slipping of the tire on a slippery road, though not with the same intensity as the original sucking cups.

The invention will be more fully described by reference to the accompanying drawing, showing by way of exemplification two kinds of embodiment of the principles thereof.

Figure 1:
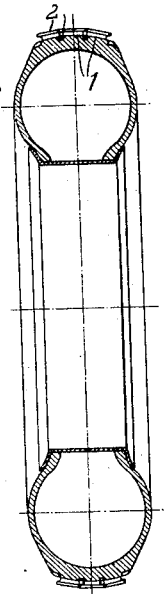
Figure 2:
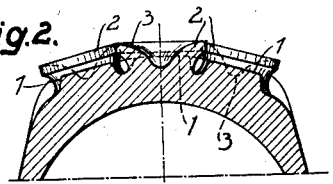
Figure 7:
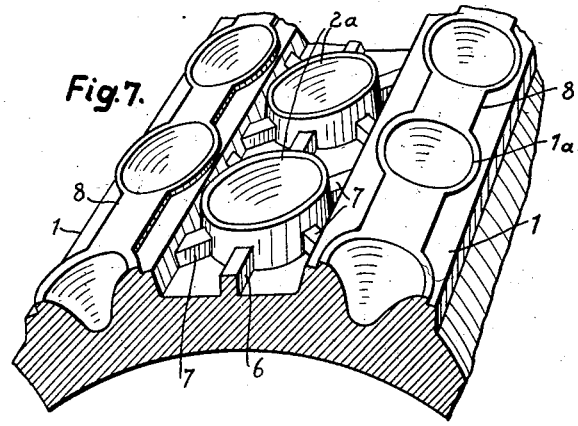
Figure 3:
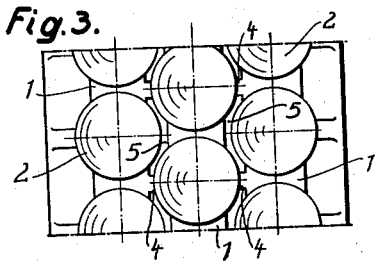
Figure 4:
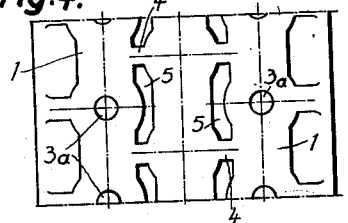
Figure 5:
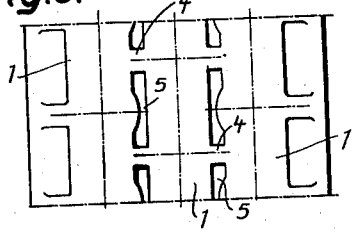
Figure 6:
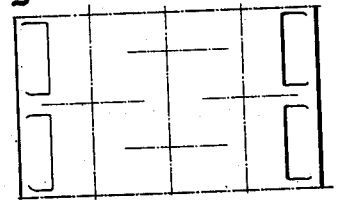

In the drawing:—Figure 1 is a sectional elevation showing the entire pneumatic cover with suction cups formed and disposed upon the tread in accordance with this invention; Figure 2 is a sectional view through the tread of the cover on an enlarged scale. Figure 3 is a plan view of the tread in fresh, unused condition—Figure 4 is a plan view of the tread surface, after the suction cups have been worn down to the surface of the circumferential ribs carrying the cups. Figure 5 is a plan view similar to that of the preceding figures and illustrating the result of the continued wearing off down to the base of the suction cavities extending into the ribs. Figure 6 shows the appearance of the tire after the wearing off of the circumferential ribs provided thereon. Figure 7 is a perspective view of a modified form of construction in which only two circumferential ribs are provided with suction-cups, a third row of suction cups being provided between these two ribs and being supported or strutted only by longitudinal and transverse ribs.

In the exemplification according to Figures 1 to 6 the pneumatic cover carries a plurality of circumferential ribs, three ribs 1 for instance being adjacently arranged in this embodiment. These circumferential ribs carry the suction cups 2 the funnel-shaped cavities 3 of which are conically reduced towards the interior and extend into the cross-sectional body of the ribs 1, as shown in Figure 2 of the drawing. The circumferential ribs 1 are connected to each other by transverse ribs 4 in such a manner that small cavities or depressions 5 are formed between the two kinds of ribs, as appears from Figure 3. After the sockets or depressions 2 have been worn off to the surface of the circumferential ribs the lower portions 3ª of the cavities of the suction cups 3 will still remain, so that a satisfactory sucking action may still be exercised by these flat and marginally conical parts 3ª. This sucking action is further increased by the depressions 5 enclosed between the circumferential and transverse ribs.

According to the tests made this kind of wearing off takes place after about 5,000 miles (8,000 kilometers) of use. After having been driven over such a distance the appearance of the tire corresponds to Figure 4. After about 10 thousand miles (about 16,000 kilometers) the circumferential and transverse ribs have been worn off to such an extent that the lower portions 3ª of the cavities of the suction cups are likewise perfectly destroyed, as shown in Figure 5. There will however still remain the circumferential and transverse ribs 1 and 4 respectively with the depressions 5 enclosed thereby and adapted to produce an anti-skidding action. Only after about 15,625 miles of travel (about 25 thousands kilometers) the circumferential and transverse ribs are perfectly worn off, so that the tire presents the smooth tread surface corresponding to Figure 6. This layer of the tire may be modified by the presence of minerals of suitable granulation or the like, so that even, when driving on this surface only, the liability of slipping is reduced to a reasonable rate.

In the modification according to Figure 7 only two circumferential ribs are provided at 1 which are disposed at the sides of the tread surface, so as to leave a peripherally extending cavity between them in which a third row of suction cups 2ª is arranged. These cups are strutted or supported by longitudinal ribs 6 and transverse ribs 7 which are shown to be radially disposed relatively to the cups 2ª similar to the spokes of a wheel. While the longitudinal ribs 6 connect the cups 2ª adjacent thereto of the intermediate row of cups, the transverse ribs 7 lead to the circumferential ribs 1 of the two exterior rows of cups. In this form of construction an additional protection against wearing off is afforded by providing a longitudinal rib 8 which extends only over a portion of the width of the circumferential rib 1 and which leads from one cup to the next succeeding cup 1ª. These ribs 8 may be of such thickness that they are flush with the upper edges of the cups 1ª.

It should be pointed out that the invention is not confined to the particular embodiments herein described and shown by way of exemplification only, but it is susceptible of further modifications and changes in accordance with varying conditions of application, except as otherwise appears from the annexed claims.

I claim:—

1. Cover for wheel tires comprising spacedly disposed circumferential ribs on the tread surface thereof, and being provided with a plurality of outwardly flaring, projecting suction cups, said cups having a cavity in the form of a shallow, obtuse-angled cone, entering into the body of said ribs.

2. Cover for wheel tires comprising spacedly disposed circumferential ribs on the tread surface thereof, and being provided with a plurality of outwardly flaring, projecting suction cups, said cups having a cavity in the form of a shallow, obtuse-angled cone, entering into the body of said circumferential ribs, and transversely disposed ribs connecting the circumferential ribs and strutting the same and the cups so as to form auxiliary vacuum tire cavities after the outwardly flaring portion of the cups are worn away.

3. Cover for wheel tires comprising spacedly disposed circumferential ribs on the tread surface thereof, and being provided with a plurality of outwardly flaring, projecting suction cups, said cups having a cavity in the form of a shallow, obtuse-angled cone, entering into the body of said circumferential ribs, and further suction cups of said form being arranged between said circumferential ribs so as to form auxiliary vacuum tire cavities after the outwardly flaring portion of the cups are worn away.

4. Cover for wheel tires comprising spacedly disposed circumferential ribs on the tread surface thereof, and being provided with a plurality of outwardly flaring, projecting suction cups, said cups having a cavity in the form of a shallow, obtuse-angled cone, entering into the body of said circumferential ribs and further suction cups of said form being arranged between said circumferential ribs and staggeringly disposed relatively to the first mentioned cups, and transverse ribs intermediate the circumferential ribs and the cups and constituting struts for the same so as to form auxiliary vacuum tire cavities after the outwardly flaring portion of the cups are worn away.

5. Cover for wheel tires comprising spacedly disposed circumferential ribs on the tread surface thereof, and being provided with a plurality of outwardly flaring, projecting suction cups, said cups having a cavity in the form of a shallow, obtuse-angled cone, entering into the body of said circumferential ribs, and transversely disposed ribs connecting the circumferential ribs and strutting the same and the cups, said transverse ribs being arranged at such distance from each other, as to form small cavities between the ribs which after wasting of the projecting part of the suction cups and with a normal load on the tire are completely closed by the road surface in the operative position so as to form auxiliary vacuum tire cavities after the outwardly flaring portion of the cups are worn away.

6. Cover for wheel tires comprising spacedly disposed circumferential ribs on the tread surface thereof, and being provided with a plurality of outwardly flaring, projecting suction cups, said cups having a cavity in the form of a shallow, obtuse-angled cone, entering into the body of said circumferential ribs, and further suction cups of said form being arranged between said circumferential ribs, and transversely disposed ribs connecting the circumferential ribs and the second mentioned cups between the circumferential ribs, said transverse ribs being arranged at such distance from each other, as to form small cavities between the ribs which after wasting of the projecting part of the suction cups and with a normal load on the tire are completely closed by the road surface in the operative position so as to form auxiliary vacuum tire cavities after the outwardly flaring portion of the cups are worn away.

ERNST COENNING.